ated Dec. 8, 1964

3,160,474
STABILIZATION OF LIQUID SULFUR TRIOXIDE
Walter G. Schnoor, Morristown, and Anthony W. Yodis, Whippany, N.J., assignors to Allied Chemical Corporation, New York, N.Y., a corporation of New York
No Drawing. Filed June 9, 1961, Ser. No. 115,926
11 Claims. (Cl. 23—174)

This invention relates to the stabilization of liquid sulfur trioxide, and particularly to the stabilization of liquid sulfur trioxide containing small quantities of $H_2SO_4$.

At room temperature, liquid sulfur trioxide polymerizes to various degrees. The three generally recognized $SO_3$ modifications melt at approximately 17° C., 32.5° C. and 62° C., respectively. On standing at temperature below about 27° C., in the presence of even small amounts of moisture, the form melting at about 17° C. rapidly polymerizes to the higher melting forms. The mass soon becomes solid and must be melted at temperatures up to 100° C. usually under dangerously high pressures.

In many industrial processes, it is highly desirable to use $SO_3$ in its strongest obtainable form. However, the foregoing characteristics of liquid sulfur trioxide create marked disadvantages relative to the storage, shipment and use of such material. While, for example, liquid sulfur trioxide might be shipped in drums equipped with heating coils, there is involved the problem of supplying a relatively expensive form of container. Moreover, since heat transfer through a solid material is poor, the solidified sulfur trioxide in the container can be melted by the user only with considerable difficulty. In addition to this disadvantage, after relatively long periods of standing, a large proportion of the liquid sulfur trioxide will have polymerized to the high melting forms in which case complete melting can only be effected by heating at high temperature under considerable pressure.

Various materials have been added to liquid sulfur trioxide to prevent the formation of solid polymers. Although boron trioxide has been successfully used commercially as a stabilizer, it leaves a solid residue after vaporization of the stabilized liquid product. Moreover, the product requires subsequent pressure treatment for effective stabilization. Use of trimethoxyboroxine or methyl borate gives a product leaving a non-flowable gummy or viscous residue after vaporization. Such residues adhere to the walls of the vaporizer, necessitating periodic cleaning of the vaporizer, e.g., by water washing, and subsequent careful drying to avoid undesirable introduction of water into the liquid sulfur trioxide. Use of dimethyl sulfate, although giving a product leaving a flowable liquid residue after vaporization, fails to stabilize liquid sulfur trioxide containing as little as about 0.01% $H_2SO_4$ (equivalent to about 0.002% $H_2O$) and often fails to stabilize completely anhydrous liquid sulfur trioxide.

An object of this invention is to provide stabilized forms of liquid sulfur trioxide which do not polymerize to any substantial degree and remain liquid at room temperature.

Another object of the invention is to provide stabilizing agents which have a high tolerance for moisture, i.e., which are effective for stabilizing liquid sulfur trioxide containing small quantities of sulfuric acid.

A still further object of the invention is to provide stabilizing agents which leave a flowable liquid residue after vaporization of the stabilized liquid sulfur trioxide.

A still further object of the invention is to provide stabilizing agents which result in a product which does not require subsequent pressure treatment for effective stabilization.

The invention also provides processes for accomplishing the foregoing objectives.

According to our invention, it has been found that liquid sulfur trioxide can be stabilized by incorporating therein a stabilizer comprising (1) a boron compound which dissolves substantially completely in liquid sulfur trioxide to form a solution of boron trioxide therein, in amount equivalent to at least about 0.005% by weight of the sulfur trioxide as $B_2O_3$, and (2) dimethyl sulfate, the weight ratio of dimethyl sulfate to boron compound as boron trioxide being at least about 7 to 1.

The liquid sulfur trioxide to be stabilized may be obtained from any source. For example, liquid $SO_3$ may be obtained commercially by distilling, say 30%, oleum under conditions to avoid vaporization of $H_2SO_4$ and condensing the $SO_3$ at temperature, say 20–30° C., at which liquid sulfur trioxide has sufficiently low vapor pressure. Similarly liquid sulfur trioxide may be obtained from the dry mist-free, say 10%, $SO_3$ exiting a catalytic $SO_2$ oxidation operation by compressing the gas to about 160–170 pounds per square inch and cooling the compressed gas to 20–25° C., under which conditions about 70% of the $SO_3$ may be liquefied and recovered as liquid sulfur trioxide. Liquid sulfur trioxide so produced generally contains about 0.01% to 0.1% $H_2SO_4$ but may contain as much as 0.2% $H_2SO_4$. Although our invention is particularly concerned with stabilization of such commercial forms of liquid sulfur trioxide, it may be applied to stabilization of completely anhydrous liquid sulfur trioxide or liquid sulfur trioxide containing up to about 1.0% $H_2SO_4$.

Any boron compound which dissolves substantially completely in liquid sulfur trioxide to form a solution of boron trioxide therein may be used in the present invention. Suitable boron compounds include inorganic compounds of the class consisting of the oxides and halides of boron and the derivatives thereof such as boron trioxide, boron trichloride, boron trifluoride, borax, sodium, potassium and other fluoborates, metaboric acid and orthoboric acid. Other suitable boron compounds include organic compounds of the class consisting of boron esters such as trimethoxy-boroxine (sometimes referred to as methyl metaborate), methyl borate and boron trifluoride-dimethyl etherate. Particularly outstanding results have been obtained using boron trioxide, trimethoxyboroxine or methyl borate.

In order to realize a flowable liquid residue upon vaporization of the stabilized liquid sulfur trioxide, the weight ratio of dimethyl sulfate to the boron compound as $B_2O_3$ must be at least about 7 to 1 and preferably ranges from about 8–10 to 1. In achieving the required ratio, the dimethyl sulfate formed in situ with certain of the boron compounds can be taken in account. For example, methyl borate reacts with sulfur trioxide to give 33.5% $B_2O_3$ and 182% dimethyl sulfate based on the weight of the methyl borate. Similarly trimethoxyboroxine yields 60% $B_2O_3$ and 109% dimethyl sulfate. For example, when methyl borate is used alone, the dimethyl sulfate to $B_2O_3$ ratio is 5.4 to 1. Excess dimethyl sulfate must then be added to give the required dimethyl sulfate to $B_2O_3$ weight ratio of at least about 7 to 1.

It is esssential that the boron compound used dissolve substantially completely in the sulfur trioxide. The easiest way to insure complete solution is to employ a soluble boron ester such as trimethoxyboroxine or methyl borate. In the case of boron compounds such as $B_2O_3$, solution can be facilitated by grinding the $B_2O_3$ to a fine powder or allowing sufficient time for the $B_2O_3$ to dissolve. If any $B_2O_3$ remains as solid in suspension in the $SO_3$, it will appear in the residue after vaporization of the $SO_3$ as discrete solid particles in suspension in a liquid matrix.

The boron compound and dimethyl sulfate each generally contributes to stabilization of the liquid sulfur trioxide; in fact, it is speculated that each has a synergizing effect in this regard. It is preferred that enough boron compound be present so that, by itself, it exerts a substantial stabilizing effect; that is, liquid sulfur trioxide containing the boron compound alone, after being frozen, will, upon standing at room temperature, convert at least about 70% back to its original liquid form. The amount of boron compound achieving such result is considered as having a substantial stabilizing effect. Use of the dimethyl sulfate in the quantity contemplated by this invention, together with such amount of boron compound, usually results in a product capable of being frozen and remelted several times with little or no formation of solid polymer.

If desired, the quantity of boron compound employed may be sufficient, by itself, to achieve completely satisfactory stabilization. In this event, the specified relative quantity of dimethyl sulfate is necessary to offset the increased tendency to produce a solid or gummy residue upon vaporization of the stabilized liquid sulfur trioxide. Such quantity of boron compound is referred to as a stabilizing amount.

Although, for reasons of economy and for minimizing the quantity of flowable liquid residue obtained, it is preferred to use as small quantities as possible of the stabilizing compounds of this invention, satisfactory stabilization is realized with much larger quantities, for example, up to the limit of solubility of the boron compound added to the liquid sulfur trioxide and corresponding amounts of dimethyl sulfate.

The quantities of boron compound and dimethyl sulfate employed in practice depend upon the degree of inhibition desired, as well as upon the $H_2SO_4$ content of the sulfur trioxide. The boron compound is ordinarily added to the sulfur trioxide in amount equivalent to about at least 0.005%, as in the order of about 0.005 to 0.1%, by weight of the sulfur trioxide as $B_2O_3$. The dimethyl sulfate is ordinarily added in amount of about 0.05 to 1.0% by weight of the sulfur trioxide. It is preferred to employ the boron compound in amount equivalent to about 0.02 to 0.04% by weight of the sulfur trioxide as $B_2O_3$ and the dimethyl sulfate in amount of about 0.2 to 0.4% by weight of the sulfur trioxide. The preferred amounts of boron compound and dimethyl sulfate give particularly outstanding results when treating liquid sulfur trioxide containing about 0.01 to 0.2% $H_2SO_4$.

Although subsequent pressure treatment may enhance the stability of the sulfur trioxide product, the treatment is unnecessary to obtain effectively stabilized sulfur trioxide. Such pressure treatment, when used, may be conducted at temperatures of 60° to 100° C. for a period of about 2 to 10 hours.

The stabilizer may be added in any known manner. For example, it may be added directly to the liquid sulfur trioxide and dissolved by agitation. Alternatively, vaporous sulfur trioxide may be condensed in a closed vessel in which the stabilizer has been previously placed.

Liquid $SO_3$ stabilized by the process of this invention remains perfectly liquid at room tempertaure, even after storage for long periods. If it is frozen, it forms a solid which, when thawed at room temperature, liquefies again. Moreover, when the stabilized liquid $SO_3$ is vaporized, it leaves a flowable liquid residue which may be readily drained from the vaporizer.

The following examples illustrate practice of our invention, parts being by weight.

*Example 1*

10,000 parts of liquid sulfur trioxide containing 0.05% $H_2SO_4$ was treated with 2 parts of $B_2SO_3$ ground to pass through a 200 mesh screen and with 20 parts of dimethyl sulfate. The reagents were first mixed together and then added to the sulfur trioxide while agitating by circulation through a pump tank. Circulation was continued for one hour to insure complete mixing. Samples were then withdrawn into ampoules and sealed to exclude extraneous moisture contamination. The samples were frozen at −10° C. and thawed at room temperature six times with substantially no formation of solid polymer.

*Example 2*

20,000 parts of liquid sulfur trioxide containing 0.05% $H_2SO_4$ was treated by the process of Example 1 using a mixture of 8 parts of trimethoxyboroxine and 40 parts of dimethyl sulfate. After mixing for one hour, samples were withdrawn and tested. They showed no formation of solid polymer after four freeze-thaw cycles.

*Example 3*

140 parts of liquid sulfur trioxide containing 0.1% $H_2SO_4$ was mixed while agitating with 0.12 part of methyl borate and 0.18 part of dimethyl sulfate. Substantially no solid polymer was formed after four freeze-thaw cycles.

*Example 4*

140 parts of liquid sulfur trioxide containing 0.28% $H_2SO_4$ was mixed while agitating with 0.14 part of trimethoxyboroxine and 0.84 part of dimethyl sulfate. Only 2% solid polymer was formed after three freeze-thaw cycles.

*Example 5*

140 parts of liquid sulfur trioxide containing 0.54% $H_2SO_4$ was mixed while agitating with 0.14 part of trimethoxyboroxine and 0.81 part of dimethyl sulfate. Only 2% solid polymer was formed after one freeze-thaw cycle.

Each of the stabilized liquid sulfur trioxide products of Examples 1 to 5, when vaporized, left a flowable liquid residue which could be removed by draining from the vaporizer.

When liquid sulfur trioxide containing as little as about 0.01% $H_2SO_4$ was treated with dimethyl sulfate alone, the product after one freeze-thaw cycle consisted of about 95% solid polymer. Moreover, completely anhydrous liquid sulfur trioxide frequently could not be stabilized by treatment with dimethyl sulfate alone, even when the amount of dimethyl sulfate constituted about 1% by weight of the sulfur trioxide.

Although we have described preferred embodiments of the present invention, the invention is deemed to be limited only by the scope of the appended claims.

We claim:

1. A composition consisting of liquid sulfur trioxide and a stabilizer comprising (1) a boron compound which dissolves substantially completely in liquid $SO_3$ to form a solution of $B_2O_3$ therein, in amount equivalent to at least about 0.005% by weight of the sulfur trioxide as $B_2O_3$, and (2) dimethyl sulfate, the weight ratio of dimethyl sulfate to boron compound as $B_2O_3$ being at least about 7 to 1.

2. A composition consisting of liquid sulfur trioxide containing at least about 0.01% $H_2SO_4$ and a stabilizer comprising (1) a boron compound which dissolves substantially completely in liquid $SO_3$ to form a solution of $B_2O_3$ therein, in amount equivalent to at least about 0.005% by weight of the sulfur trioxide as $B_2O_3$, and (2) dimethyl sulfate, the weight ratio of dimethyl sulfate to boron compound as $B_2O_3$ being at least about 7 to 1.

3. A composition consisting of liquid sulfur trioxide containing at least about 0.01% $H_2SO_4$ and a stabilizer comprising (1) a boron compound selected from the group consisting of $B_2O_3$, trimethoxyboroxine and methyl borate, in amount equivalent to at least about 0.005% by weight of the sulfur trioxide as $B_2O_3$, and (2) dimethyl sulfate, the weight ratio of dimethyl sulfate to boron compound as $B_2O_3$ being at least about 7 to 1.

4. A composition consisting of liquid sulfur trioxide containing at least about 0.01% $H_2SO_4$ and a stabilizer comprising (1) a boron compound selected from the group consisting of $B_2O_3$, trimethoxyboroxine and methyl borate, in amount equivalent to about 0.005 to 0.1% by weight of the sulfur trioxide as $B_2O_3$, and (2) dimethyl sulfate, in amount of about 0.05% to 1.0% by weight of the sulfur trioxide, the weight ratio of dimethyl sulfate to boron compound as $B_2O_3$ being at least about 7 to 1.

5. A composition consisting of liquid sulfur trioxide containing about 0.01 to 0.2% $H_2SO_4$ and a stabilizer comprising (1) a boron compound selected from the group consisting of $B_2O_3$, trimethoxyboroxine and methyl borate, in amount equivalent to about 0.02 to 0.04% by weight of the sulfur trioxide as $B_2O_3$, and (2) dimethyl sulfate, in amount of about 0.2 to 0.4% by weight of the sulfur trioxide, the weight ratio of dimethyl sulfate to boron compound as $B_2O_3$ being at least about 7 to 1.

6. The method of stabilizing liquid sulfur trioxide which comprises incorporating in said sulfur trioxide a stabilizer comprising (1) a boron compound which dissolves substantially completely in liquid $SO_3$ to form a solution of $B_2O_3$ therein, in amount equivalent to at least about 0.005% by weight of the sulfur trioxide as $B_2O_3$, and (2) dimethyl sulfate, the weight ratio of dimethyl sulfate to boron compound as $B_2O_3$ being at least about 7 to 1.

7. A composition consisting of liquid sulfur trioxide and a stabilizer comprising (1) a boron compound which dissolves substantially completely in liquid $SO_3$ to form a solution of $B_2O_3$ therein, in amount sufficient to exert a substantial stabilizing effect on the sulfur trioxide, and (2) dimethyl sulfate, the weight ratio of dimethyl sulfate to boron compound as $B_2O_3$ being at least about 7 to 1.

8. A composition consisting of liquid sulfur trioxide and a stabilizer comprising (1) a boron compound selected from the group consisting of $B_2O_3$, trimethoxyboroxine and methyl borate, in amount sufficient to exert a substantial stabilizing effect on the sulfur trioxide, and (2) dimethyl sulfate, the weight ratio of dimethyl sulfate to boron compound as $B_2O_3$ being at least about 7 to 1.

9. A composition consisting of liquid sulfur trioxide and a stabilizer comprising (1) a boron compound which dissolves substantially completely in liquid $SO_3$ to form a solution of $B_2O_3$ therein, in amount sufficient to stabilize the sulfur trioxide, and (2) dimethyl sulfate, the weight ratio of dimethyl sulfate to boron compound as $B_2O_3$ being at least about 7 to 1.

10. A composition consisting of liquid sulfur trioxide and a stabilizer comprising (1) a boron compound selected from the group consisting of $B_2O_3$, trimethoxyboroxine and methyl borate, in amount sufficient to stabilize the sulfur trioxide, and (2) dimethyl sulfate, the weight ratio of dimethyl sulfate to boron compound as $B_2O_3$ being at least about 7 to 1.

11. The method of stabilizing liquid sulfur trioxide which comprises incorporating in said sulfur trioxide a stabilizer comprising (1) a boron compound which dissolves substantially completely in liquid $SO_3$ to form a solution of $B_2O_3$ therein, in amount sufficient to stabilize the sulfur trioxide, and (2) dimethyl sulfate, the weight ratio of dimethyl sulfate to boron compound as $B_2O_3$ being at least about 7 to 1.

References Cited in the file of this patent

UNITED STATES PATENTS

| | | |
|---|---|---|
| 2,458,718 | McCann | Jan. 11, 1949 |
| 2,492,706 | McCann | Dec. 27, 1949 |
| 2,833,625 | Pick | May 6, 1958 |